United States Patent [19]

Ingram

[11] Patent Number: 5,299,173
[45] Date of Patent: Mar. 29, 1994

[54] METHOD AND APPARATUS FOR UNDERWATER SONAR SCANNING

[75] Inventor: Robert Ingram, Wallsend, United Kingdom

[73] Assignee: British Gas plc, United Kingdom

[21] Appl. No.: 784,324

[22] Filed: Oct. 31, 1991

[30] Foreign Application Priority Data

Nov. 1, 1990 [GB] United Kingdom ............... 9023726

[51] Int. Cl.⁵ .............................................. G01S 15/00
[52] U.S. Cl. ......................................... 367/88; 367/12
[58] Field of Search ................................... 367/12, 88

[56] References Cited

U.S. PATENT DOCUMENTS 4,232,380 11/1980 Caron et al. .......................... 367/88

FOREIGN PATENT DOCUMENTS

85/04004 9/1985 PCT Int'l Appl. .
2108993A 10/1979 United Kingdom .
2083219A 3/1982 United Kingdom .

*Primary Examiner*—Daniel T. Pihulic
*Attorney, Agent, or Firm*—Larson & Taylor

[57] ABSTRACT

A sonar buoy 40 has narrow-beam sonar heads 80, 82 driven by a stepper motor 84. The heads produce sonar data for example accurately measuring the seabed. The buoy is handled by a crane wire 41 held taut by a float above the buoy and attached to a clump weight 46 resting on the seabed (although shown in retracted condition). A wire 50 runs from a winch 48 around pulleys 52 on the weight 46 and is connected to a lever 54 of a gimbal mechanism 56 which has two transducers 62, 70 giving measurements of the "X" position and the "Y" position of the buoy. A footage mechanism 76 is driven by the wire 41 and has a transducer giving a measurement of the heave position. A compass 88 and roll and pitch transducers at 86 give measurements of the heading position and the roll and pitch positions. The sonar data is compensated for the position of the buoy using a computer.

9 Claims, 13 Drawing Sheets

METHOD AND APPARATUS FOR UNDERWATER SONAR SCANNING

The invention relates to underwater sonar scanning.

In this specification "sea" means the sea or other body of water and expressions involving "sea" are to be interpreted accordingly.

Underwater sonar scanning is used when a coffer dam is being installed on the seabed, for example, or where a mound of mud resulting from oil drilling operations is to be scanned. The mound of mud is scanned in order to gain accurate dimensions of the mound. However, whatever feature is scanned the accuracy of the data obtained is greatly improved if the motion of the scanning sonar head or heads, due to sea motion is compensated for.

According to the invention, a method of underwater sonar scanning comprises using a narrow-beam sonar head or heads to produce sonar data, the head or heads being mounted on a body immersed in the sea, obtaining measurements relating to the position of the body with respect to the seabed and using the measurements in a computer to enable the sonar data to be compensated for the position of the body.

The body may be a coffer dam or a buoy, a ROV, a weighted frame or structure, or a ROV-type frame or structure with or without buoyancy.

Apparatus, according to the invention, comprises a body, a narrow-beam sonar head or heads mounted on the body, transducer means mounted on the body giving measurements relating to the position of the body and a computer to receive the sonar data and the measurements and to compensate the data for the position of the body.

Several embodiments of the invention will now be described by way of example with reference to the accompanying drawings, in which:

FIGS. 4, 5(a), 5(b) and 6 correspond to FIGS. 1 to 3 but show a second embodiment;

Figure 1:
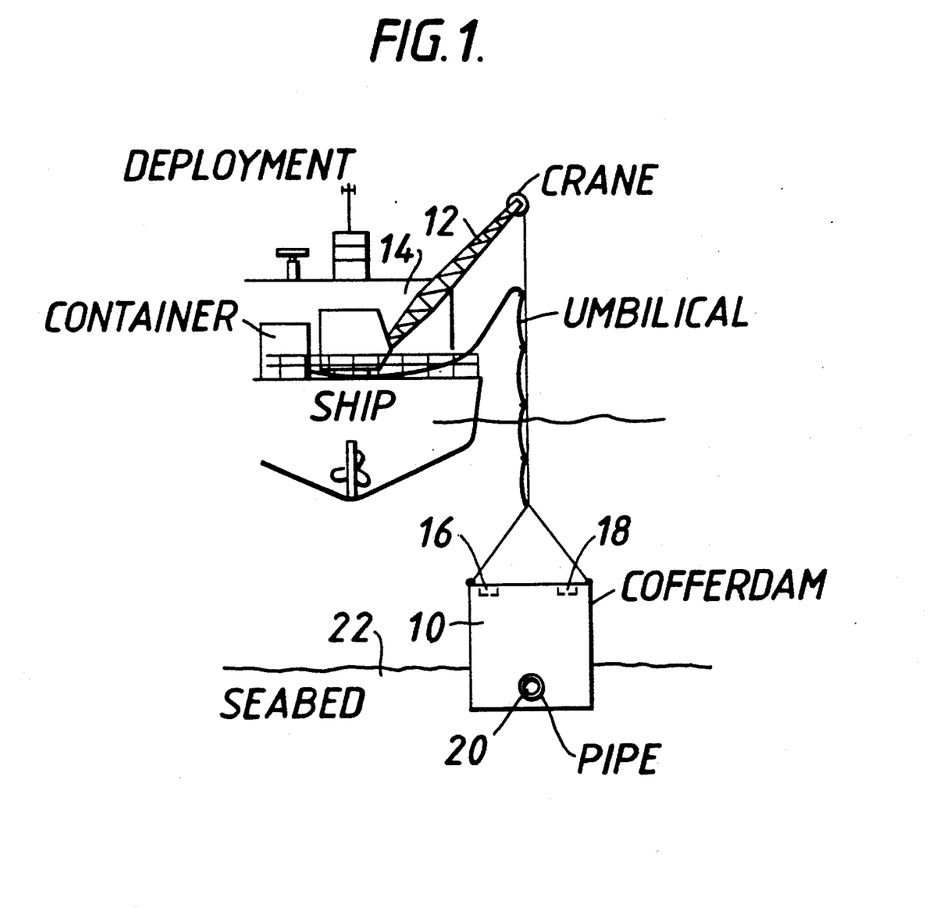
FIG. 1 is a schematic view of a coffer dam in position over a pipeline buried in the seabed, together with a support vessel.
Figure 2:
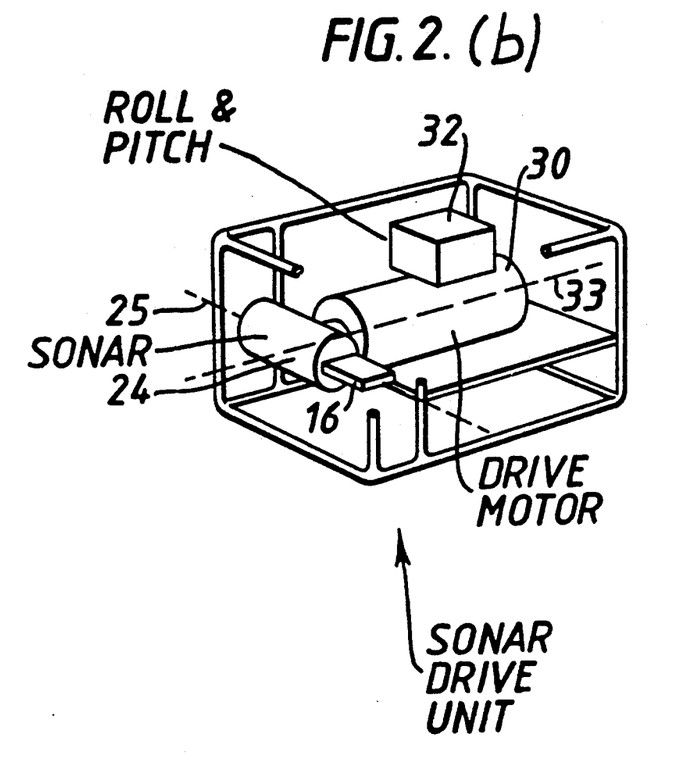
FIGS. 2(a) and 2(b) show details of the coffer dam shown in FIG. 1.
Figure 3:
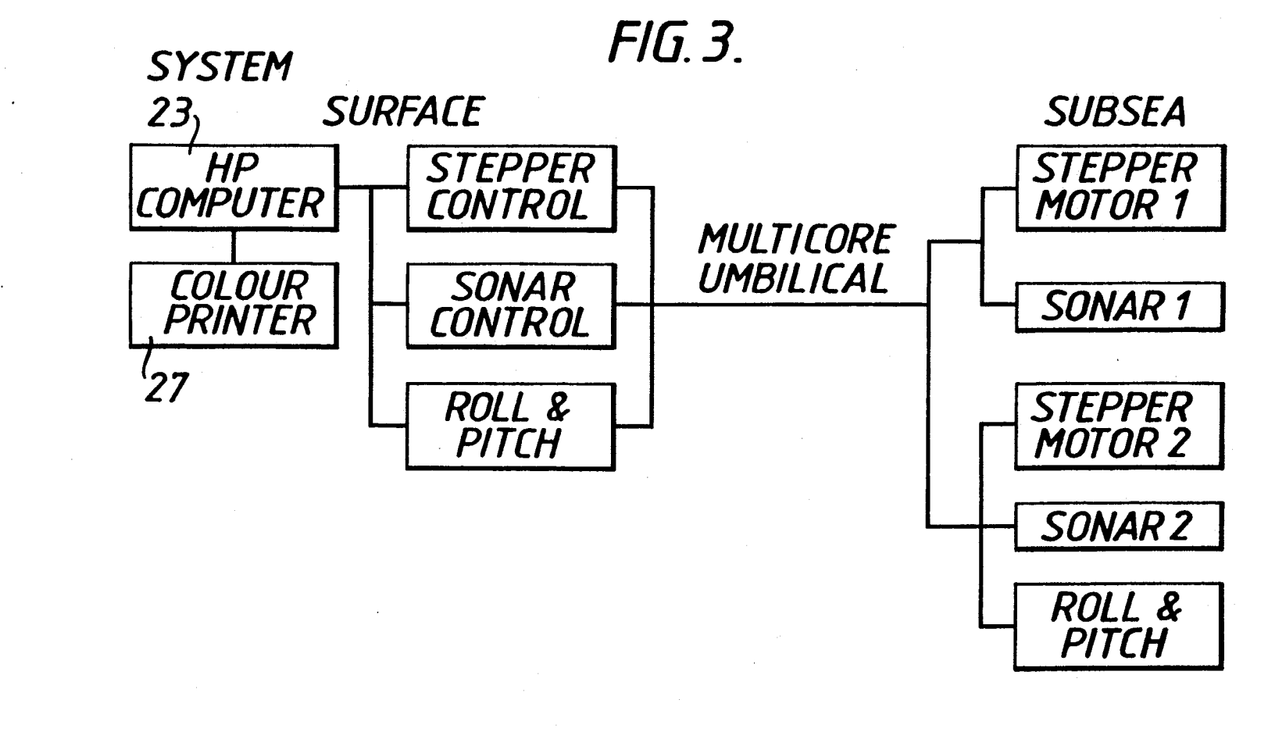
FIG. 3 is a block schematic showing the system of FIG. 1.

FIGS. 1 to 3 show a system in which a coffer dam 10 is lowered to the seabed by a crane 12 on a support vessel 14. The coffer dam 10 has two narrow-beam sonar heads 16, 18 placed on its end walls. The coffer dam 10 is placed in position over a pipeline 20 buried in the seabed 22. The dam is of the self-excavating type and the ends of the dam ultimately engage the pipeline 20. The pipeline 20 may not be horizontal and it is not possible in general to ensure that the dam excavates itself down to a perfectly horizontal position.

Once the coffer dam 10 has finished excavating to position itself, the sonar heads 16, 18 are operated to give a picture of the seabed within the coffer dam 10 and the inside walls of the coffer dam. It is necessary to correct the sonar data so that all measurements are eventually taken in relation to a mean horizontal plane and therefore the coffer dam position is compensated for by obtaining measurements from the pitch and roll transducers. These indicate the degree to which the coffer dam position differs from a true horizontal position in the longitudinal sense (pitch measurement) and a true horizontal position in the width sense (roll measurement). These measurements are used to correct the sonar data when the seabed within the dam is scanned by the sonar heads 16, 18. The correction is performed in a computer 23 and a corrected representation is produced by a printer 27.

The position of the real seabed some distance away from the coffer dam (the seabed near the coffer dam curves downwardly where excavation to accommodate the walls of the coffer dam has taken place) is sensed by a pressure monitor giving a pressure P1. The height of one sonar head is also sensed by another pressure monitor giving a pressure P2. The difference between P1 and P2 gives a measurement of the height of the sonar head in relation to the real seabed. This measurement can be used to compensate the sonar data using the computer. Alternatively, the difference in pressure measurement (P1−P2) is used as an indicator on a visual representation of the sonar data to relate the representation to the real seabed.

The sonar head 16 has a stepper motor 24 driving the head 16 about an axis 25 and has a second stepper motor 30 driving the head 16 about an axis 33. The head 18 is similar to the head 16 and the two heads produce a 3-dimensional picture of the seabed within the coffer dam 10. The head 16 scans across the pipe 20, the head being incremented for successive sonar "shots" by the stepper motor 24. The head 16 also scans parallel to the pipe, the head being incremented by the stepper motor 30.

The head 16 has associated with it a transducer 32 from which two measurements, one of roll position and one of pitch position, are obtained. The transducer is preferably of the type available under the trade name TRIMCUBE from Measurement Devices Leasing Limited of Aberdeen, Scotland.

Figures 4, 5:
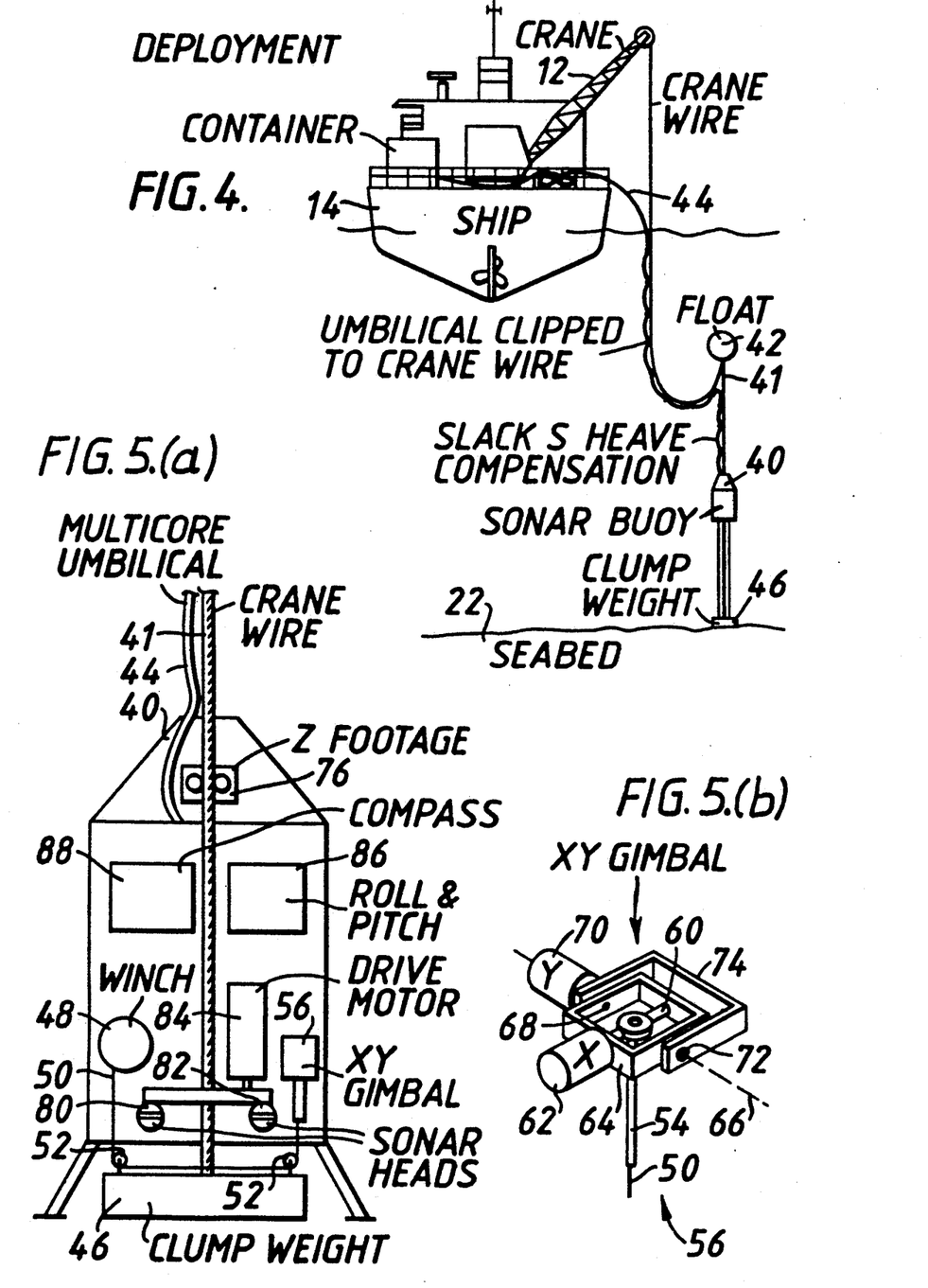
Figure 6:
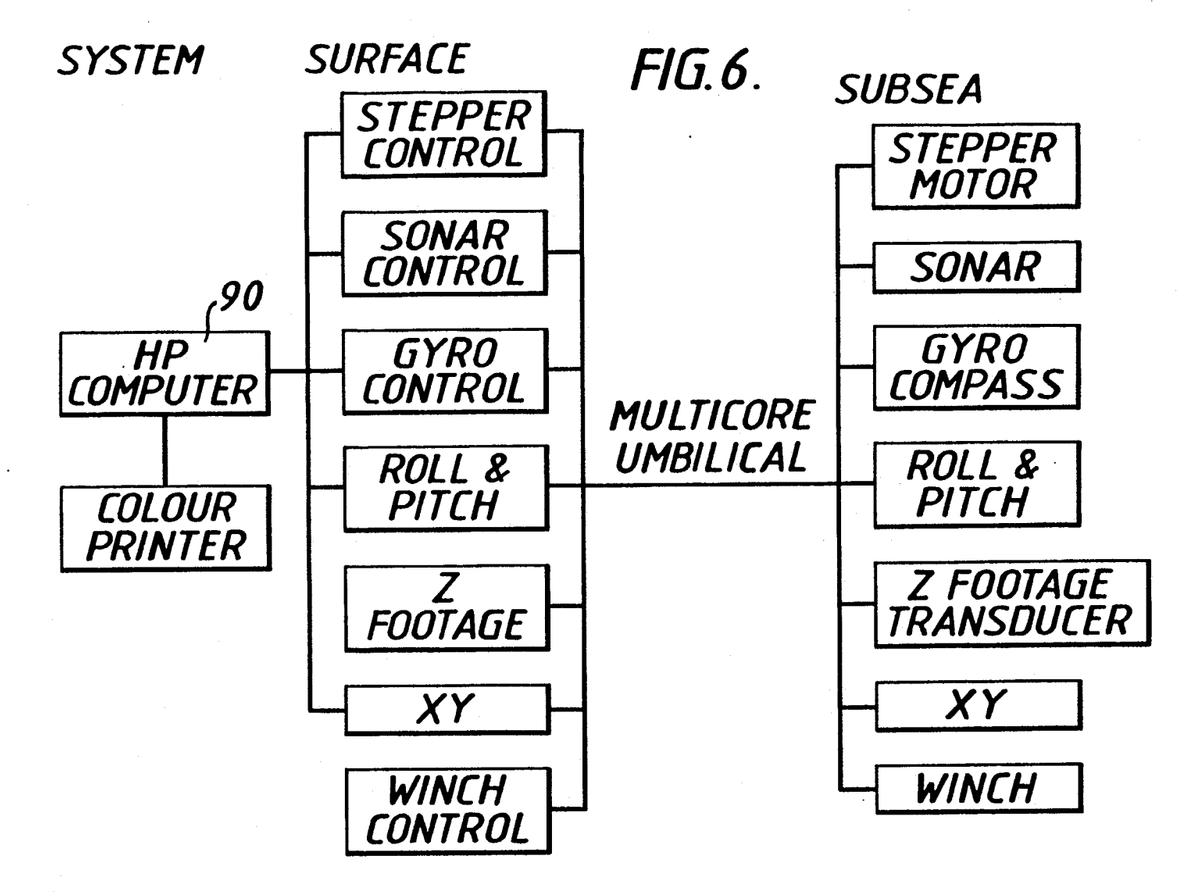

FIGS. 4, 5 and 6 show a sonar buoy 40 which is suspended above the seabed 22 by a wire rope 41 attached to a float 42, together with an umbilical cable 44. The wire 41 is handled by a crane 12 on a support vessel 14. The wire 41 goes downwardly through the buoy 40 and is attached to a clump weight 46 resting on the seabed 22.

The buoy 40 carries a winch 48 from which a wire rope 50 extends around two pulleys 52 on the clump weight 46 and the rope 50 is attached to a lever 54 of a gimbal mechanism 56.

The lever 54 is fast with a shaft 60 of a first angular transducer 62. The transducer 62 is mounted on a frame 64, which is pivoted about an axis 66 at right angles to the shaft 60. The frame 64 is fast with a shaft at 68, concentric with the axis 66, and the shaft 68 is the shaft of a second angular transducer 70. The axis 66 is defined by the shaft 68 and another shaft 72 both of which are journalled in a frame 74 secured to the body of the buoy 40.

Motion of the buoy 40 relative to the clump weight 46 on the seabed 22 causes displacements of the transducers 62 and 70 giving measurements of the "X" and "Y" components of motion of the buoy 40. These measurements are used to compensate the sonar data for the sea motion.

The buoy 40 also has a footage mechanism 76 comprising two wheels which run on the wire rope 41 and which drive a transducer giving a measurement of the length of the wire rope 41 between the clump weight 46 and the horizontal level occupied by the two sonar heads (see below). Using that information in conjunction with the "X" and "Y" angular information from the transducers 62 and 70 and the roll and pitch angular information from the transducer 86, the lateral displacements (surge and sway) and the perpendicular movement (heave) are calculated. The buoy 40 also carries two sonar heads 80, 82 on a common mounting driven by a stepper motor 84. Finally the buoy 40 has a roll and a pitch transducer at 86, and a compass 88 giving a measurement of the heading of the buoy 40.

As shown in FIG. 6, the measurements corresponding to heading (the compass 88) roll and pitch, the sway position "X" and the surge position "Y" are used in a computer 90 to compensate the sonar data for the sea motion of the buoy 40.

The sonar heads 80, 82 scan the seabed, for example to make an accurate picture of the area to be excavated. For each emitted sonar pulse, and its return pulse, there is a corresponding set of measurement values of heading, roll, pitch, "X" position and "Y" position which are used in the computer 90 to compensate for the motion of the buoy 40 due to sea motion.

Figure 7:
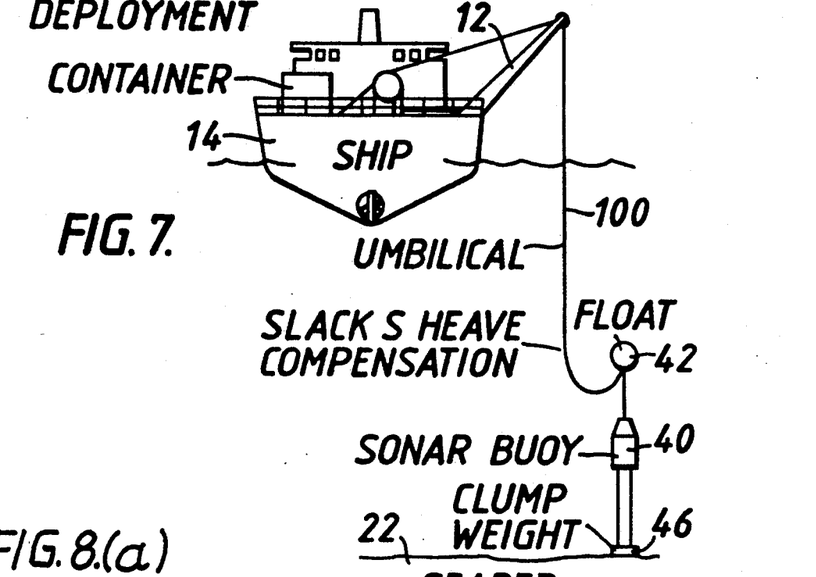
FIGS. 7, 8(a) and 8(b) correspond to FIGS. 1, 2(a) and 2(b) but show a third embodiment.
Figure 8:
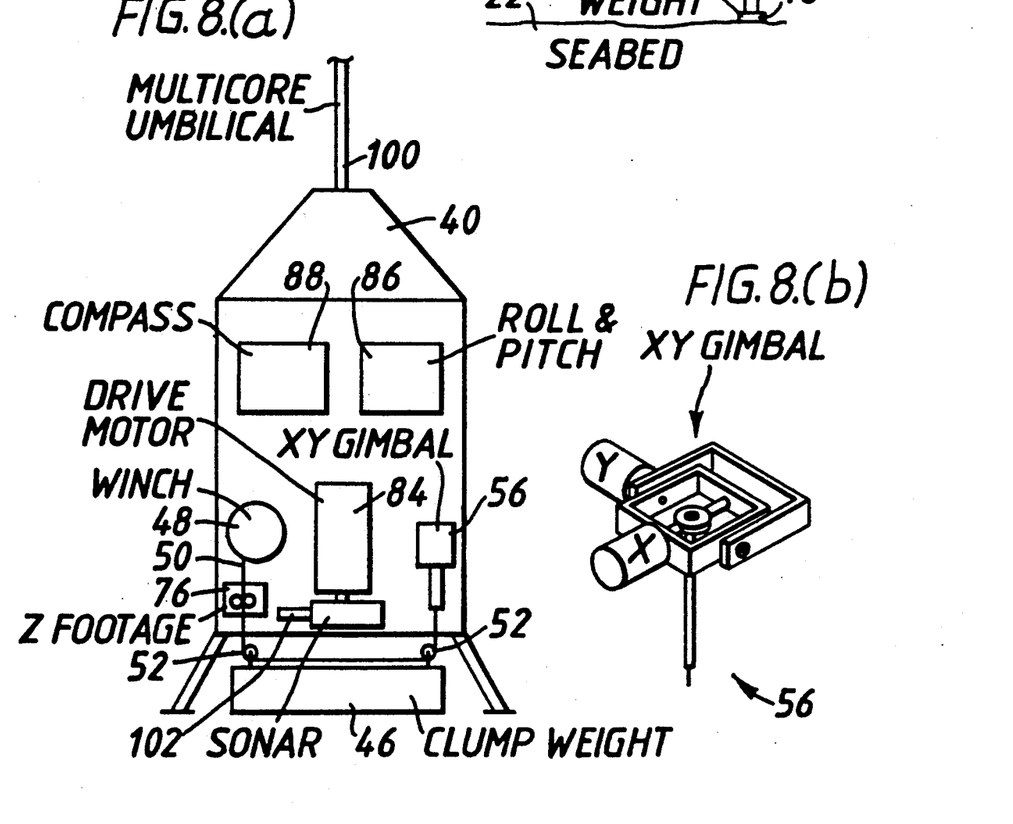

FIGS. 7 and 8 shown an embodiment similar to that shown in FIGS. 4 to 6 and reference numerals are used which are the same for the same components. However, the umbilical cable 100 is combined with a crane wire (not shown) and is used to lift the buoy 40 into and out of the water.

The wire rope 50 from the winch 48 passes drives the footage mechanism 76, instead of the crane wire 41 as in the previous embodiment. A single sonar head 102 is shown on the buoy 40 driven by a stepper motor 84.

The measurements from the transducers corresponding to heading, roll and pitch, the sway position "X" and the surge position "Y" are used in a computer to compensate the sonar data for the sea motion of the buoy 40 as before.

Figure 9:
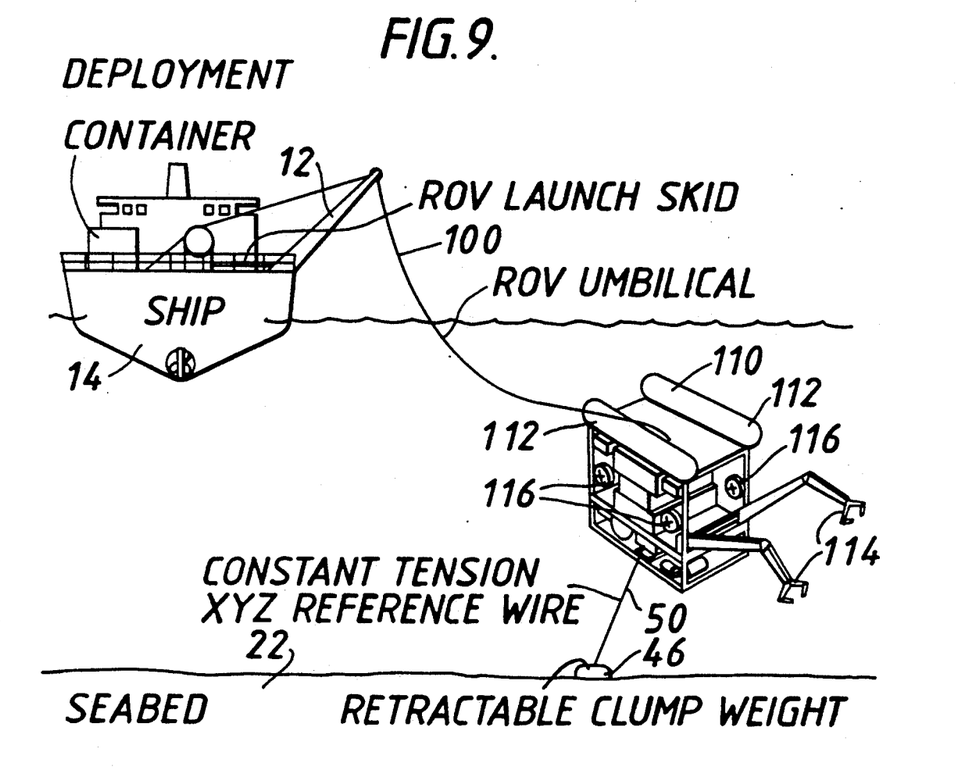
FIGS. 9, 10(a), 10(b) and 11 correspond to FIGS. 1 to 3 but show a fourth embodiment.
Figure 10:
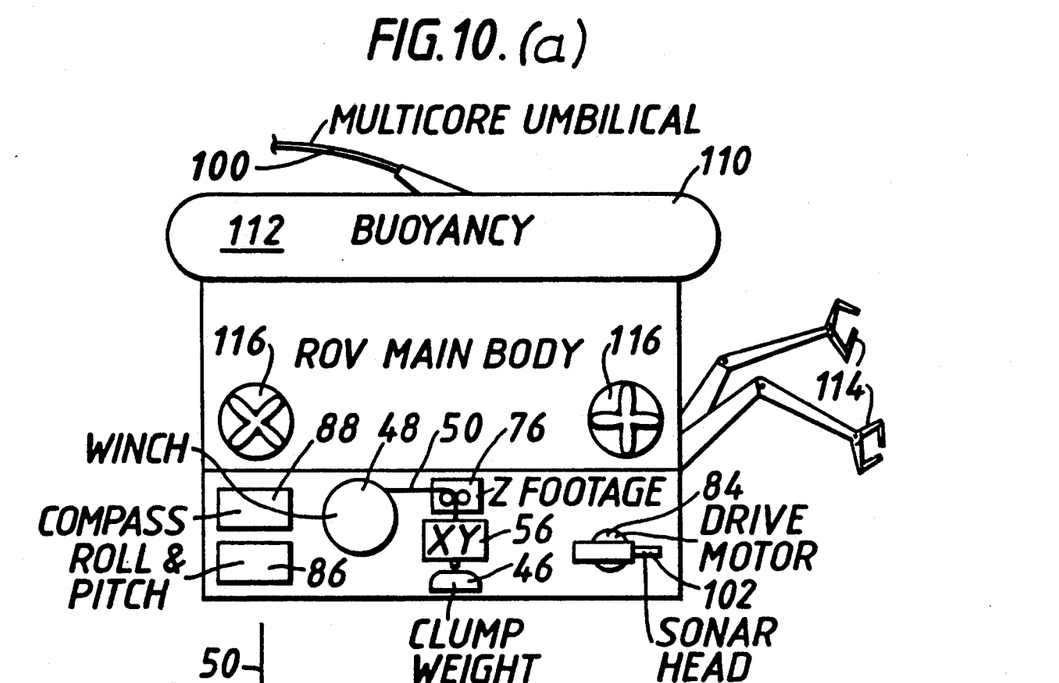
Figure 11:
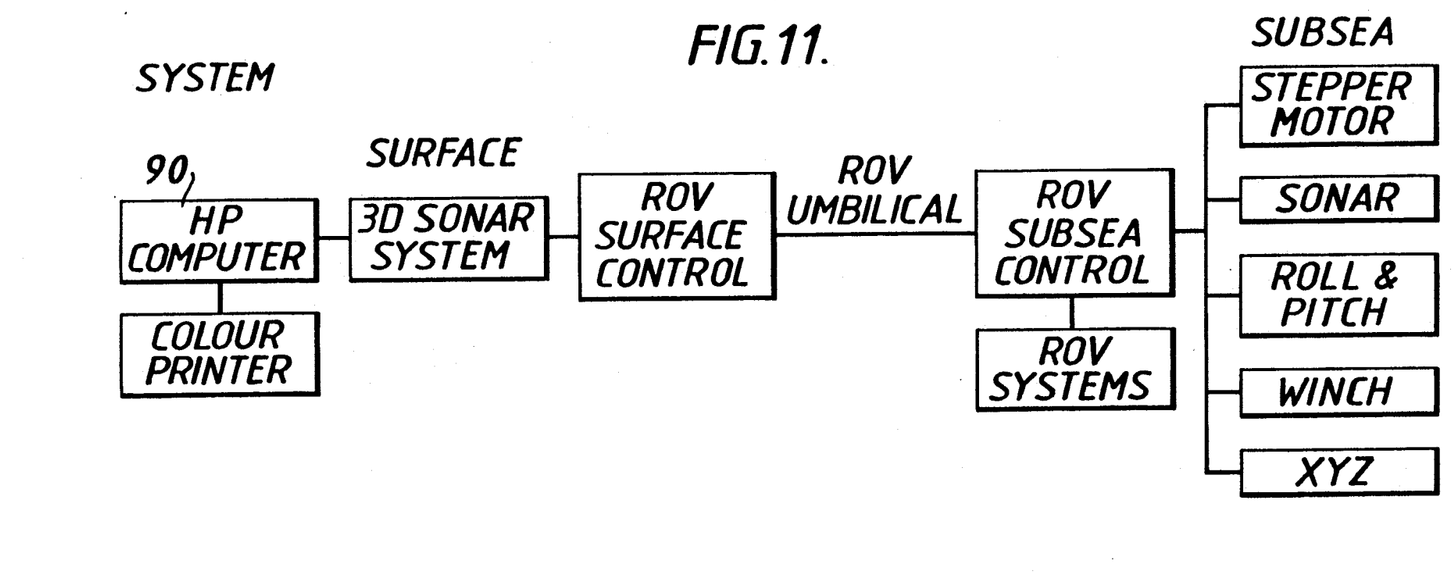

FIGS. 9 to 11 show yet another embodiment. This time the "body" is formed by a ROV 110 having buoyancy tanks 112 and connected to the crane 12 of the support vessel 14 by an umbilical 100 combining a lifting wire handled by the crane 12 as before.

The ROV 110 has manipulators 114 and four drive propellers 116 driven by electric motors. The ROV has a single sonar scanning head 102 driven by a stepper motor 84.

The wire rope 50 drives the footage mechanism 76 and passes downwardly from the mechanism 76 through the bore of the lever 54 which is hollow in this instance. The rope 50 is connected directly to the clump weight 46.

The winch 48 shown in FIGS. 5 and 8 is electrically or hydraulically driven and is non-rotatable unless electric or hydraulic power is applied to the winch.

The winch shown in FIG. 10 a constant force is applied to the clump weight 46 (a relatively light weight compared to the 1 ton weight for example used in FIGS. 5 and 8) to lift the weight while the ROV is launched or recovered from the sea or the ROV is travelling without scanning the seabed.

When scanning is to be carried out a constant force of lower value is applied to the weight (this value is less than the weight of the clump weight 46) so that the clump weight descends to the seabed. The constant force is maintained to keep the wire 50 tight while the winch 48 recovers the wire 50, or allows the wire 50 to be paid out as the ROV moves due to sea motion, even though the ROV propellers are endeavouring to keep the ROV at a constant position.

The sonar data is compensated for sea motion of the ROV using the measurements from the transducers in the computer 90 as before.

Figure 12:
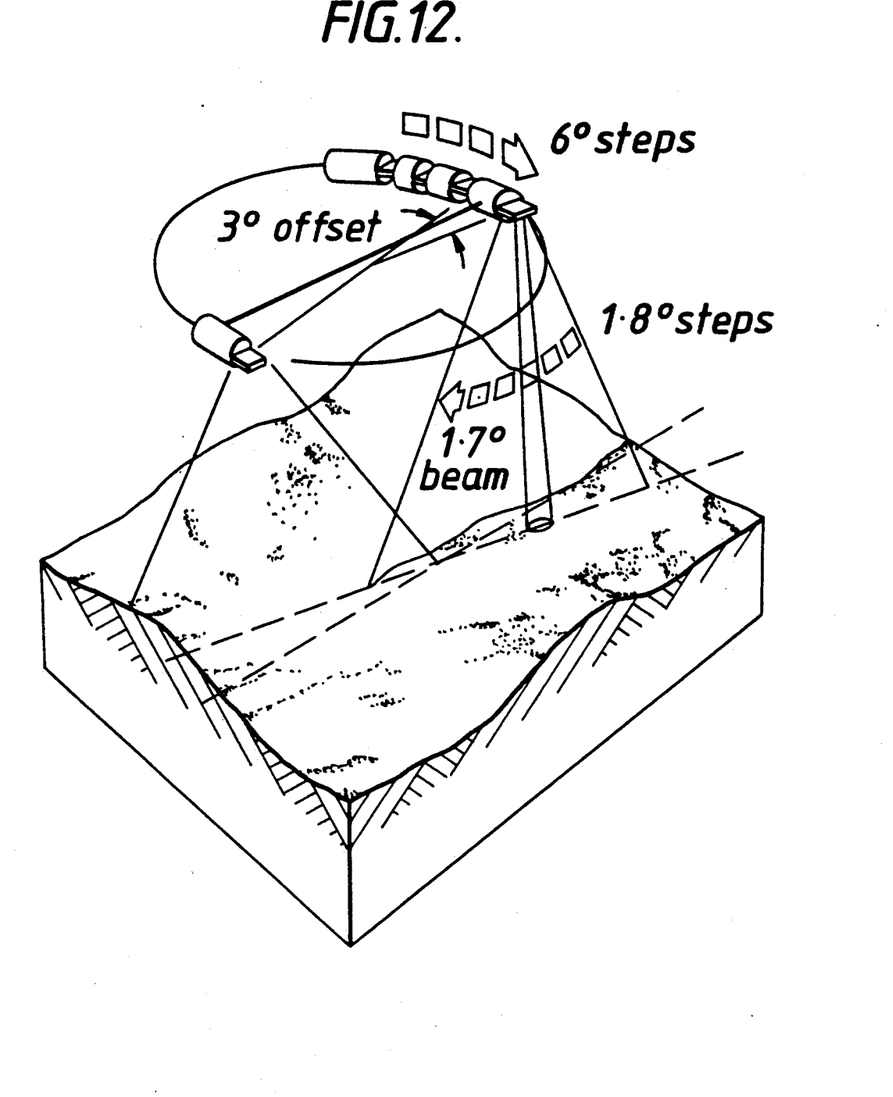
FIG. 12 is a three dimensional view of the embodiment of FIGS. 4 to 6 in use.

FIG. 12 shows the embodiment of FIGS. 4 to 6 in use. The scanning heads are rotated through 180° in steps of 6°. At each step, each scanning head emits a sonar pulse in a beam having an included angle of 1.7°. Each head is incremented in steps of 1.8° through a fan-shaped arc, as shown, of 120°. The scanning heads are not parallel but are mutually offset by 3° (as shown). This gives better distribution of the non-overlapping scans. This mode of scanning is known as radial scanning. The scan angle can be varied from 90° to 180°. For the system shown in FIG. 12, a total of 30 double scans are recorded over a total number of 60 radial scans. For head increments of 1.8° and scan angles of 180°, 60 scans will produce 6000 data points.

There follows next a mathematical description of the compensation of sonar data obtained from operation of the embodiment described with reference to FIGS. 4 to 6 and 10. The description is with reference to FIGS. 13 to 18.

Figure 13:
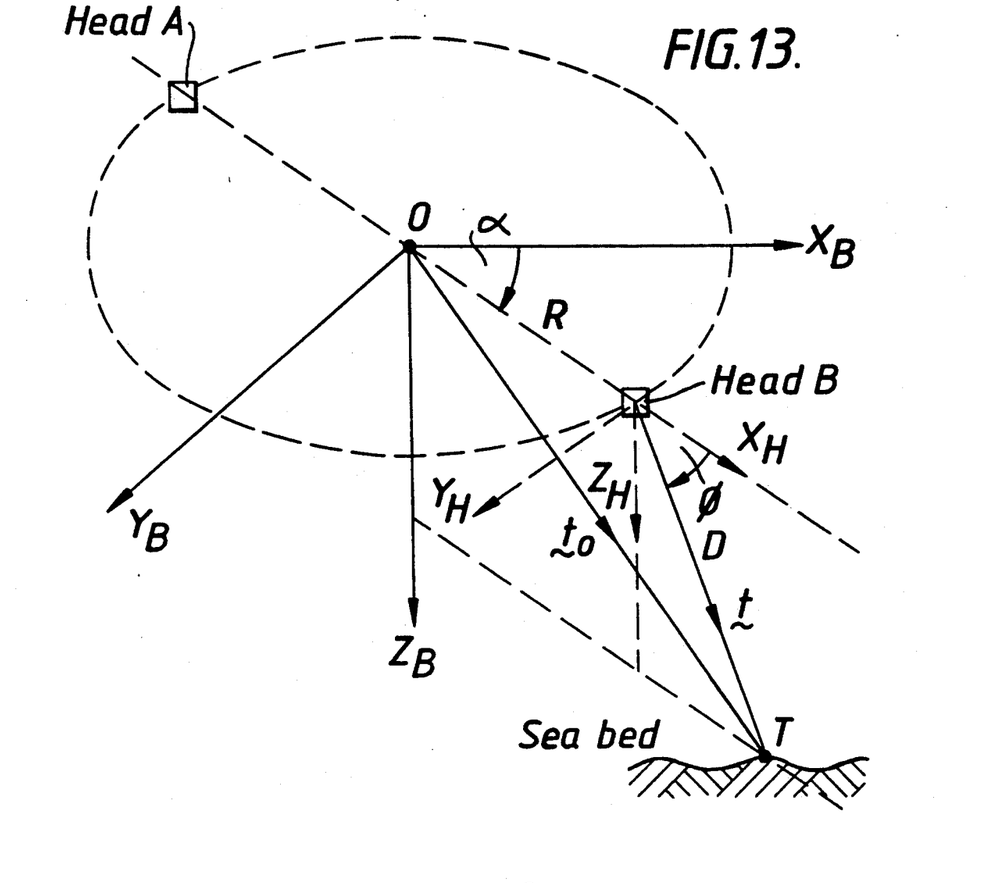
FIGS. 13 to 18 are mathematical figures used in a mathematical explanation of the operation of the embodiment shown in FIGS. 4 to 6 and 10.

The buoy carries two sonar heads on a common mounting driven by a stepper motor. Define a right-handed coordinate system fixed in the buoy with the X-axis aligned with the compass heading 0° N, then the heads A and B are stepped incrementally around the described circle in the XY plane.

FIG. 13 shows a sonar return at head B during a scan of the sea-bed.

(Here refer to FIG. 13 which has the heading and legend shown below:

Sonar Return at Head B During Scan of Seabed

Legend $\underline{t}$ is target vector relative to head B
$\underline{t}_o$ is target vector relative to buoy origin O
$X_H Y_H Z_H$ is co-ordinate system fixed at head B
$X_B Y_B Z_B$ is co-ordinate system fixed in buoy
$\alpha$ is angle between head B and $X_B$ axis due to stepper motor
R is radius of described circle
D is distance of target T from head B
$\phi$ is angle of sonar pulse from $X_B Y_B$ plane)

The co-ordinates of the target relative to the origin O are then given by:

$$\underline{t}_o = (D \cos \phi + R, \ 0, \ D \sin \phi) \qquad (1a)$$

A similar expression can be derived for head A during its scan, for distance D' and angle $\phi'$ this can be written:

$$\underline{t}_o = (D' \cos \phi' - R, \ 0, \ D' \sin \phi') \qquad (1b)$$

The following analysis will then apply equally to scans from head B and head A. The co-ordinates of the target relative to the axes of the buoy itself are then given by a rotation of the target vector $t_o$ through an angle $-\alpha$ about $Z_B$, the Z-axis of the buoy:

$$\underline{t}_B = \underline{T}(\underline{t}_o, \underline{k}, -\alpha) \tag{2}$$

where
$\underline{k} = (0,0,1)$ a unit vector along Z-axis of buoy
$\underline{T}$ is a vector function representing the rotation
The vector function $\underline{T}(\underline{a}, \hat{\underline{n}}, \theta)$ is a general rotation of a vector $\underline{a}$ through an angle $\theta$ about an axis defined by a unit vector $\hat{\underline{n}}$.

Figure 14:
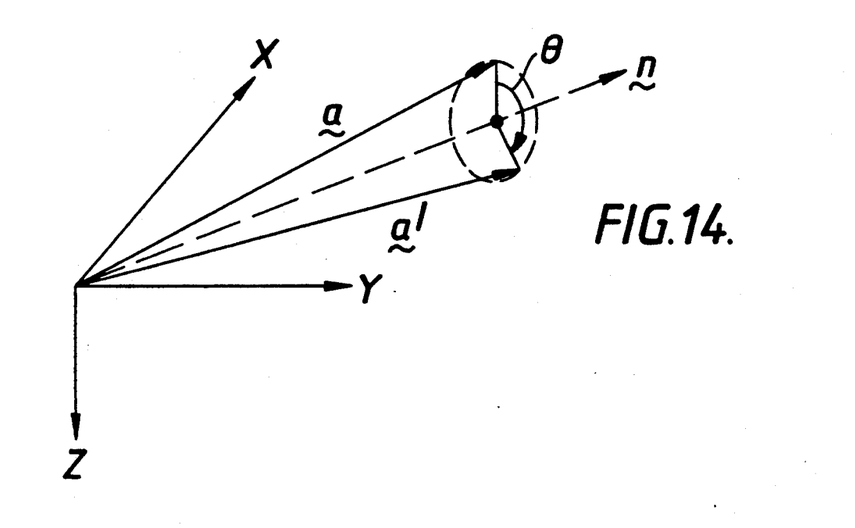

Here refer to FIG. 14 which has the heading and legend shown below:

Rotation of a Vector About General Axis

Legend

XYZ are a right-handed coordinate system
$\underline{n}$ is axis of rotation
$\theta$ is angle of rotation
$\underline{a}$ is vector to be rotated
$\underline{a}'$ is resultant vector).

The vector function is given by:

$$\underline{T}(\underline{a}, \hat{\underline{n}}, \theta) = (\underline{a} \cdot \hat{\underline{n}})\hat{\underline{n}} + \cos\theta(\underline{a} - (\underline{a} \cdot \hat{\underline{n}})\hat{\underline{n}}) + \sin\theta(\hat{\underline{n}}(\underline{a} - (\underline{a} \cdot \hat{\underline{n}})\hat{\underline{n}})) \tag{3}$$

In general the buoy will be in constant motion with both rotational movement and changing displacement from its anchoring clump weight.

A fixed origin and coordinate system are defined outside of the buoy to which all target data can be related.

Figure 15:
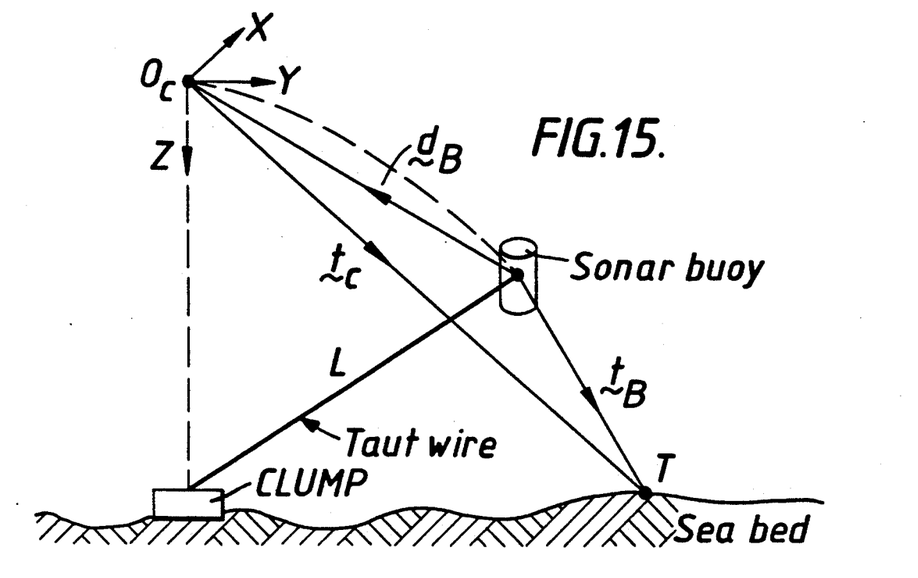
Figure 16:
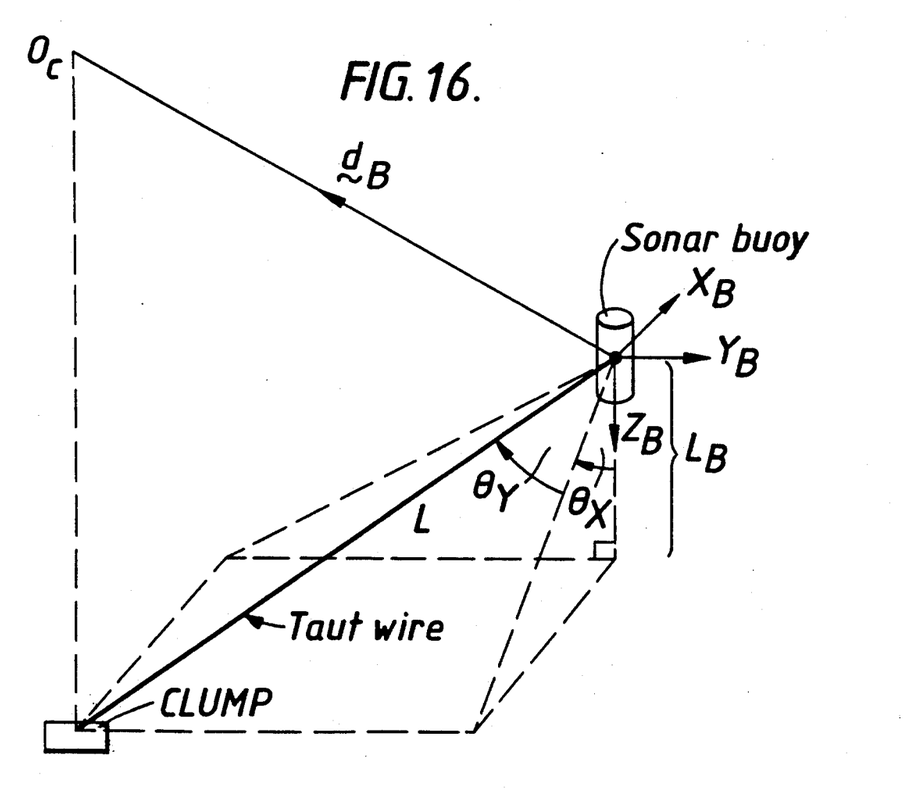

Consider first the case of no rotational movement but the buoy is displaced from its original position, the displacement in X, Y and Z, i.e. the surge, sway and heave components can be measured by the XY gimbal system on the buoy, see FIGS. 15 and 16.

The wire is kept taut and is of measured length L, calculated from the footage unit.

Here refer to FIG. 15 which has the heading and legend shown below:

Sonar Buoy held by Taut Wire Displaced from Original Position at $O_c$

Legend

XYZ is coordinate system at fixed point $O_c$ above clump weight
L is length of taut wire
T is target
$\underline{d}_B$ is displacement vector of $O_c$ relative to buoy
$\underline{t}_B$ is target vector relative to buoy
$\underline{t}_C$ is target vector relative to fixed origin $O_c$).

From FIG. 15 we see that:

$$\underline{t}_C = \underline{t}_B - \underline{d}_B \tag{4}$$

Here refer to FIG. 16 which has the heading and legend shown below:

Displacement of Sonar Buoy With No Rotational Movement

Legend

L is length of taut wire
$O_c$ is fixed origin outside of buoy
$\underline{d}_B$ is displacement vector relative to the buoy
$X_B Y_B Z_B$ is co-ordinate system fixed in buoy
$\theta_X$ is angular displacement in $X_B Z_B$ plane
$\theta_Y$ is angular displacement in plane of taut wire and $Y_B$ $L_B$ is Z displacement relative to buoy)

FIG. 16 shows the displacement of the buoy with no rotational movement. The gimbal mechanism reads two angular displacements $\phi_X$ and $\phi_Y$ between the buoy and the taut wire, as shown.

Then $$\underline{d}_B = (-L \sin\theta_X \cos\theta_Y, -L \sin\theta_Y, L - L_B) \tag{5}$$

where $$L_B = L \cos\theta_X \cos\theta_Y \tag{6}$$

Now consider the full case where the buoy is also in rotational movement; define the three degrees of rotational freedom as:
Pitch—clockwise rotation around Y-axis of buoy
Roll—clockwise rotation around X-axis of buoy
Heading—clockwise rotation around Z-axis of buoy
Then Equation (4) in the case of rotational movement would give an apparent position of the target:

$$\underline{t}_C = \underline{t}_B - \underline{d}_B$$

and the true position of the target compensating for the rotational movement is $$\underline{t}_C = \underline{C}(\underline{t}_B) - \underline{C}(\underline{d}_B) \tag{7}$$

where $\underline{C}(\ )$ is a vector function representing a series of transformations to correct for roll, pitch and heading of the buoy.

Therefore, given the information to calculate the vectors $\underline{d}_B$ and $\underline{t}_B$ in equations (2) and (5) and by application of the compensation function, from equation (7) the true sonar target position can be calculated.

The compensation function is described in detail below:

The Compensation Function

Figure 17:
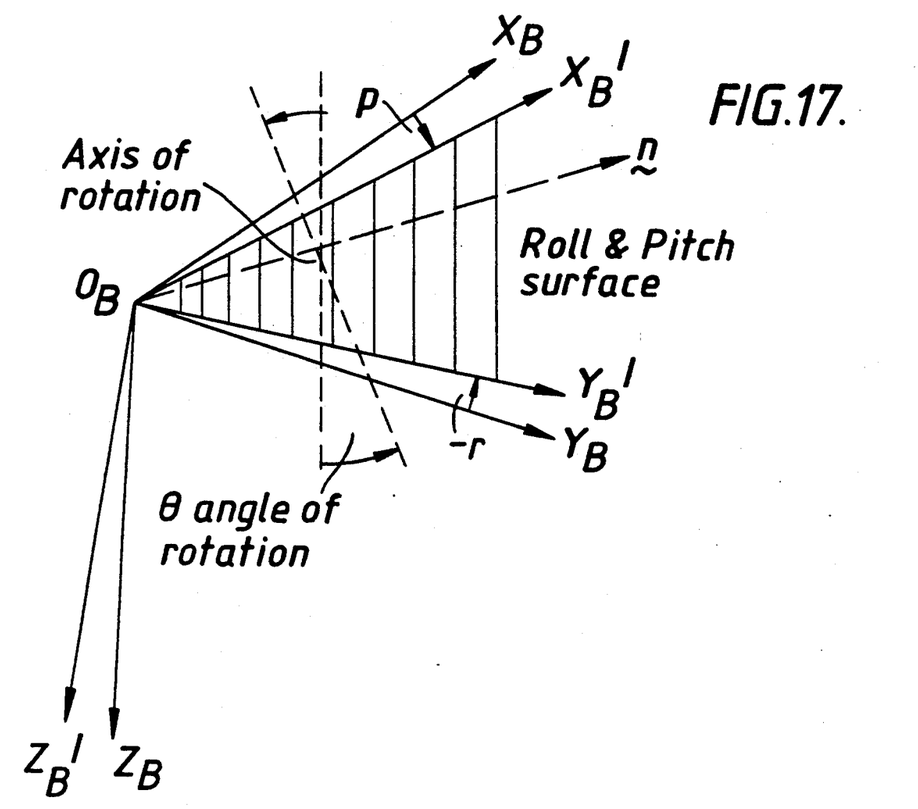

The function is split into three stages:
i) Correct for roll and pitch
The roll and pitch of the sonar buoy are measured in terms of a surface, see FIG. 17, which is at an angle to the fixed axes of the buoy.

Here refer to FIG. 17 which has the heading and legend shown below:

Compensation For Roll and Pitch of Buoy

Legend $X_B Y_B Z_B$ are axes of buoy without pitch and roll
$X_B' Y_B' Z_B'$ are axes of pitch and roll surface
p is pitch angle
r is roll angle
$\underline{n}$ is axis of rotation for pitch and roll compensation
$\theta$ is angle of rotation about $\underline{n}$ for pitch and roll compensation)

From FIG. 17 we can calculate the angle of rotation $\theta$ and axis of rotation n of the surface relative to fixed axes:

$$\theta = \tan^{-1}(\sqrt{\tan^2 p + \tan^2 r}) \tag{8}$$

$$\hat{\underline{n}} = (-\tan r, \tan p, 0) \tag{9}$$

Then $\underline{C}_{rp}( )$ the compensation function for roll and pitch of the buoy is:

$$\underline{C}_{rp}(\underline{a}) = \underline{T}(\underline{a}, \hat{\underline{n}}, -\theta) \tag{10}$$

where
$\underline{a}$ is a target or displacement vector and
$\underline{T}( )$ is defined in equation (3)
This represents a rotation through a composite roll and pitch angle corresponding to levelling the roll and pitch surface.

ii) Correct for heading change

Figure 18:
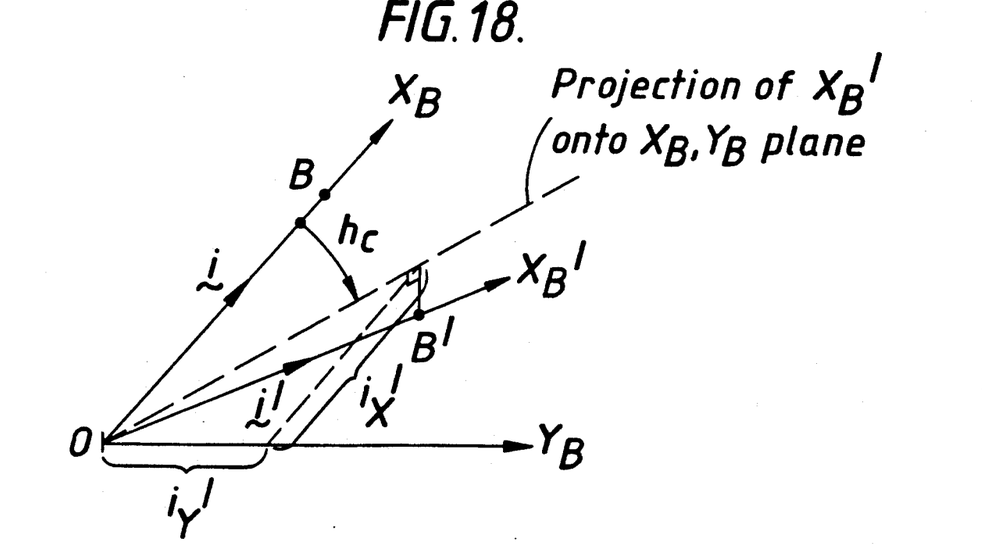

The compensation for roll and pitch changes the heading of the buoy and a correction must be applied, see FIG. 18.

Here refer to FIG. 18 which has the heading and legend shown below:

Heading Correction

Legend $\underline{i}$ is unit vector along $X_B$ axis represented by $\vec{OB}$
$\underline{i}'$ is resultant vector of pitch and roll of $\underline{i}$, represented by $\vec{OB'}$
$X_B, Y_B$ are X,Y axes of buoy without pitch and roll
$X_B'$ is X-axis of pitch and roll surface
$h_c$ is heading correction To calculate heading change, take unit vector $\underline{i}$ representing the corrected heading and take it through the roll and pitch of the buoy, giving a vector $\underline{i}'$ representing the actual measured heading. Then, if $\underline{i} = (1,0,0)$, then from section (i) above, $$\underline{i}' = \underline{T}(\underline{i}, \hat{\underline{n}}, \theta) \tag{11}$$

where
$\underline{T}( )$ is defined in equation (3)
and $$\underline{i}' = (i'x, i'y, i'z) \tag{12}$$

The corrected heading is then given by:

$$h = h' - \tan^{-1}\left(\frac{i'y}{i'x}\right) \tag{13}$$

where
h = corrected heading
h' = measured heading iii) Correct for heading of sonar buoy To correct for heading of the buoy rotate the roll and pitch compensated vector through the corrected heading $-h$ about the Z axis of the buoy:

$$\underline{C}(\underline{a}) = \underline{T}(\underline{a}, \underline{k}, -h) \tag{14}$$

where:
$\underline{a}$ is the target or displacement vector corrected for roll and pitch
$\underline{k}$ is unit vector along Z axis
h is corrected heading $\underline{T}( )$ is defined in equation (3)

I claim:

1. A method of underwater sonar scanning in a sea having a seabed, said method comprising using a sonar head or heads to produce sonar data, the head or heads being mounted on a body immersed in the sea, obtaining, in addition to said sonar data, measurements relating to the position of the body with respect to the seabed and using the measurements in a computer to enable the sonar data to be compensated for the position of the body.

2. A method according to claim 1, the body being a coffer dam and two spaced apart sonar heads being used.

3. A method according to claim 1, the body being a buoy, a ROV, a weighted frame or structure, or a ROV-type frame or structure with or without buoyancy.

4. A method according to claim 1, the measurements including measurements relating to one or more of the following: roll; pitch; heading; sway; surge; and heave.

5. A method according to claim 4, the body being attached to a clump weight, resting on the seabed, by a wire rope and maintaining a tension in the wire rope, the measurements including obtaining measurements of the angular displacements of the wire rope about two mutually normal axes on the body.

6. Apparatus for underwater sonar scanning comprising a body, a sonar head or heads mounted on the body, transducer means mounted on the body for producing measurements relating to the position of the body and a computer means for receiving the sonar data and the measurements and for compensation the data for the position of the body.

7. Apparatus according to claim 6, the body being handled by a crane wire connected to a clump weight resting on a seabed and running from a crane on a support vessel, a wire passing from a winch on the body around pulley means on a clump weight to the lever of a gimbals mechanism on the body, the gimbals mechanism driving two transducers to give measurements corresponding to the sway position and surge position of the body, the crane wire passing in a loop to a float above the body which keeps the crane wire below it taut.

8. Apparatus according to claim 6, the body being handled by a crane wire which passes in a loop to a float above the body the crane wire running from a crane on a support vessel, the float keeping the wire taut between itself and the body, a wire passing from a winch on the body around pulley means on a clump weight resting on a seabed to the lever of a gimbals mechanism on the body, the gimbals mechanism driving two transducers to give measurements corresponding to the sway position and the surge position of the body.

9. Apparatus according to claim 6, the body being handled by a crane wire running from a crane on a support vessel, a wire passing from a winch on a body to a clump weight resting on the seabed, the wire from a winch passing through the longitudinal bore of a lever of a gimbals mechanism driving two transducers to give measurements corresponding to the sway position and the surge position of the body.

* * * * *